United States Patent [19]

Pelkiö

[11] Patent Number: 5,618,422
[45] Date of Patent: Apr. 8, 1997

[54] DISC FILTER SECTOR

[75] Inventor: Ari Pelkiö, Savonlinna, Finland

[73] Assignee: Ahlstrom Machinery Oy, Helsinki, Finland

[21] Appl. No.: 545,731

[22] PCT Filed: Mar. 28, 1994

[86] PCT No.: PCT/FI94/00111

§ 371 Date: Feb. 6, 1996

§ 102(e) Date: Feb. 6, 1996

[87] PCT Pub. No.: WO94/26389

PCT Pub. Date: Nov. 24, 1994

[30] Foreign Application Priority Data

May 6, 1993 [FI] Finland .................................. 932039

[51] Int. Cl.⁶ .................................................. B01D 33/23
[52] U.S. Cl. ........................ 210/323.1; 210/346; 210/486
[58] Field of Search ................................ 210/323.1, 324, 210/330, 331, 345, 346, 486, 487

[56] References Cited

U.S. PATENT DOCUMENTS

| | | |
|---|---|---|
| 2,392,354 | 1/1946 | Alsop . |
| 2,781,133 | 2/1957 | Thompson . |
| 3,331,512 | 7/1967 | Vore ........................................ 210/487 |
| 3,948,779 | 4/1976 | Jackson . |
| 4,968,423 | 11/1990 | McKale et al. .......................... 210/346 |
| 5,227,065 | 7/1993 | Strid ........................................ 210/346 |

FOREIGN PATENT DOCUMENTS 544636  11/1992  European Pat. Off. .

Primary Examiner—W. L. Walker
Attorney, Agent, or Firm—Nixon & Vanderhye P.C.

[57] ABSTRACT

A disc filter (and disc filter constructed from a number of sectors) includes a filter member and a supporting structure. The supporting structure is formed by two opposed perforated plates which each have at least about 70% flat supporting portions which separate recess portions (which typically extend radially). The recess portions of each plate are welded to either supporting portions or recess portions of the other plate.

21 Claims, 2 Drawing Sheets

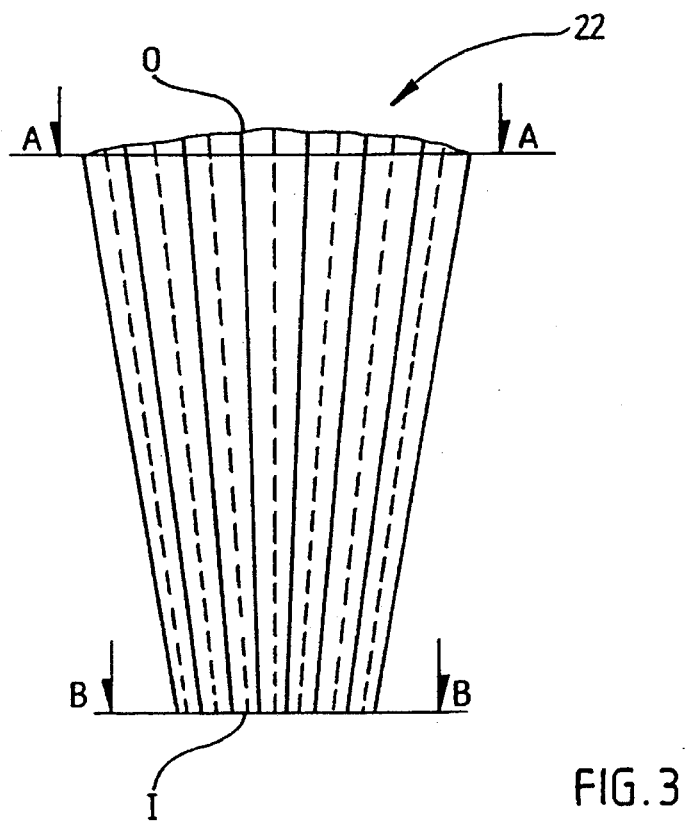
FIG.3
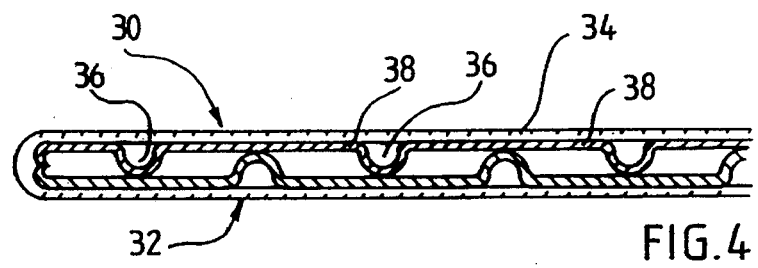
FIG.4
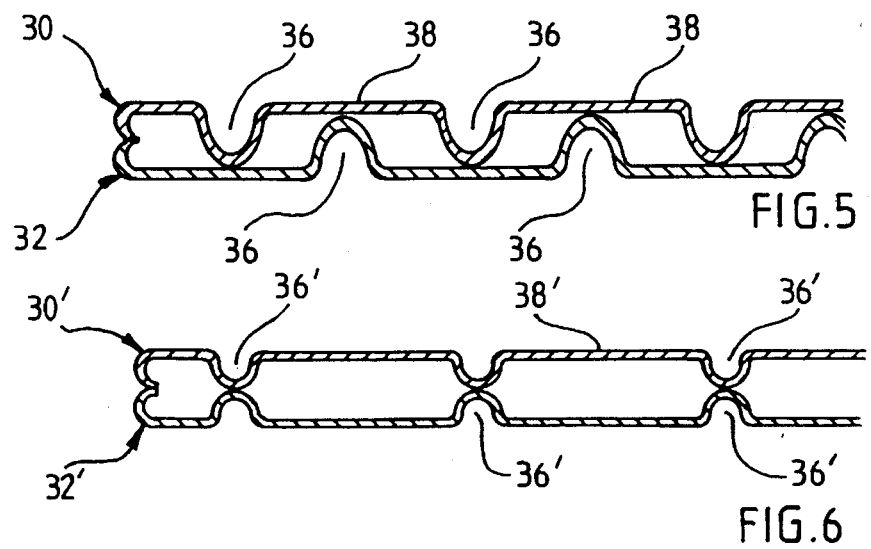
FIG.5
FIG.6

DISC FILTER SECTOR

CROSS REFERENCE TO RELATED APPLICATION

This application is the U. S. National Phase of PCT/FI94/00111 filed Mar. 28, 1994.

BACKGROUND AND SUMMARY OF THE INVENTION

The present invention relates to a disc filter sector. The disc filter sector in accordance with the present invention is especially suitable for both wood processing and mining industry.

A disc filter is an apparatus used in both wood processing and mining industry primarily for thickening materials. The filter most usually comprises a number of discs which are arranged on a horizontal shaft, and the surface of which is made liquid-permeable. The discs of the filter are arranged in a vat rotatably around their axis so that at least a half of the disc surfaces is submerged in the vat in the material to filtered. Said discs are formed of a number of so called sectors next to each other having their inner ends connected to the shaft so that the liquid that has passed the sector surface is allowed to flow from the inside of the sector through the shaft out from the apparatus. The surface of the sectors may be made either of cloth, plastics or metal wire or even of a perforated plate. If a wire is used the sector requires a special supporting structure, which keeps the flexible and elastic wire in shape. Almost an innumerable amount of different technical solutions are possible in the supporting structure of the sector. For example, the use of different wooden or plastic profiles as supporting structures is known.

Swedish patent 79654 illustrates a sector structure, which has a plate substantially undulating in V-shape, in which plate the undulations are parallel. U.S. Pat. No. 3,948,779 disclose a supporting structure for the sector, which is also undulating in V-shape, but the undulations in this arrangement are radial. WO publication 87/04640 also illustrates a sector structure having V-shaped radial undulations. Further, also published Swedish patent application 465 658 discloses a supporting structure with V-shaped undulations. It is a characterizing feature of all above described structures that the filtering surface of the sector is supported against the ridge of the undulated plate, whereby the pressure differences between the outer and inner surface of the sector, especially at high pressures of the washing liquid, of course, tend to press the wire surface to the groove between the ridges. Moreover, the bending stiffness parallel to the rim of such an undulated sector is very weak, especially when the supporting structure is simple.

The above mentioned US and WO publications as well as U.S. Pat. No. -2781,133 also each methods of making the supporting structure of the sector rigid parallel to the rim, for example, by arranging two undulated plates opposite to each other or by attaching supporting ribs or like parallel to the rim of the undulated plates. The positioning of such supporting ribs and finding appropriate welding surfaces makes the manufacture of the sector complicated and risky.

The object of the present invention is to facilitate the manufacture of the filter sector and to simplify the structure thereof. If, for example, a sector in accordance with the present invention is manufactured by welding, the amount of the necessary welding spots diminishes at least to half of the previous. Further, an object of the present invention is to bring about a sector having a high bending stiffness. Yet another object of the present invention is to bring about a sector, which is highly supporting to the wire.

The characteristic features of a disc filter sector fulfilling the objects of the present invention become apparent in the accompanying patent claims.

Advantages of a sector of the present invention compared with the sectors in accordance with prior art are, for example, the following:

- a sturdy box structure, in which separate supporting ribs inside the sector are not necessary;
- it supports the wire well;
- separate flow channels for the filtrate, i.e. a small flow resistance;
- the filtrate volume may be minimized allowing a possibility to optimize the whole operation of the filter apparatus;
- smaller need of material, lighter, easier to manufacture, less welding, minimized plate thickness compared to a conventional perforated plate sector;
- it is easy to arrange the "conicity" of the sector towards the inner end by means of undulations, the part closer to the shaft being thicker than the part further apart, whereby the cross-sectional flow area remains constant throughout the entire sector;
- 90% of the through-washability remains; and
- the sector is formed of identical halves, which further facilitates the manufacture of the sector.

BRIEF DESCRIPTION OF THE DRAWING

The invention is further described below, by way of example, with reference to the accompanying drawings, in which:

FIG. 3 schematically illustrates a sector of a disc filter in accordance with the present invention;

FIG. 4 schematically illustrates a preferred embodiment of the present invention as a sectional view along line A—A in FIG. 3;

FIG. 5 schematically illustrates a preferred embodiment of the present invention as a sectional view along line B—B in FIG. 3; and FIG. 6 schematically illustrates another embodiment of the present invention as a sectional view along line A-A in FIG. 3.

DETAILED DESCRIPTION OF THE DRAWINGS

Figure 1:
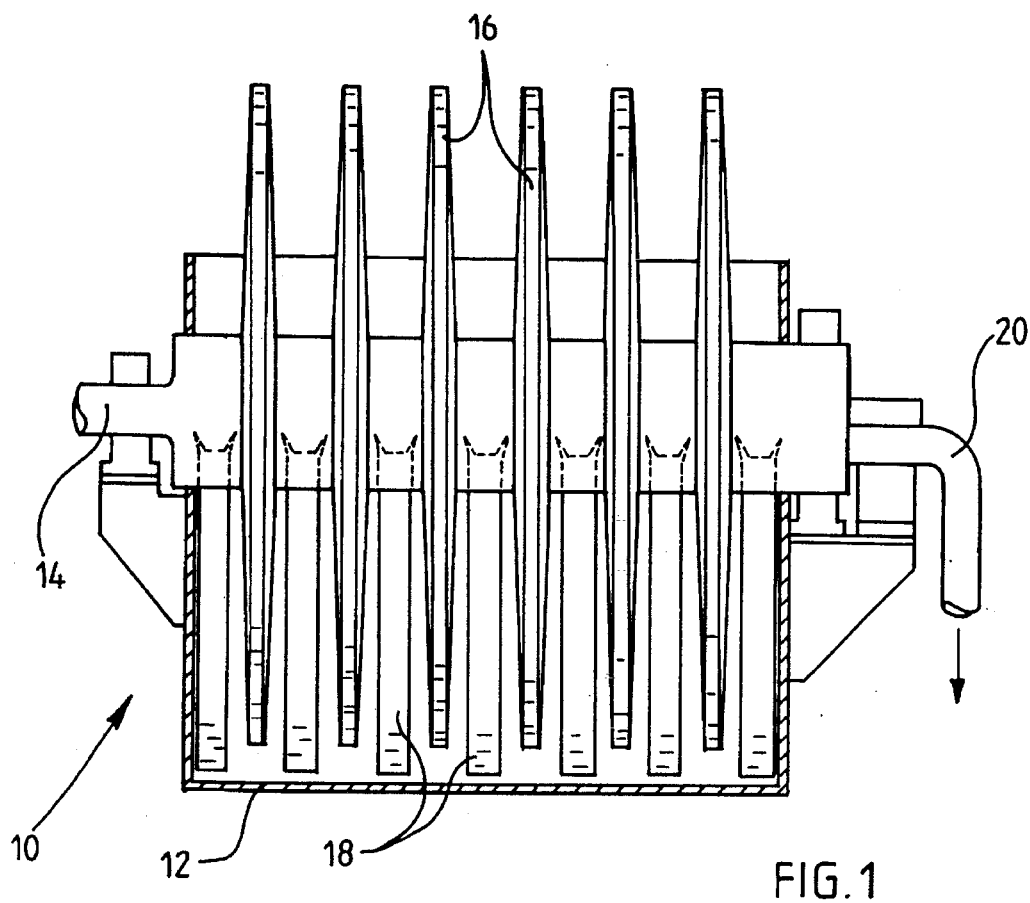
FIG. 1 schematically illustrates a disc filter in accordance with the prior art.
Figure 2:
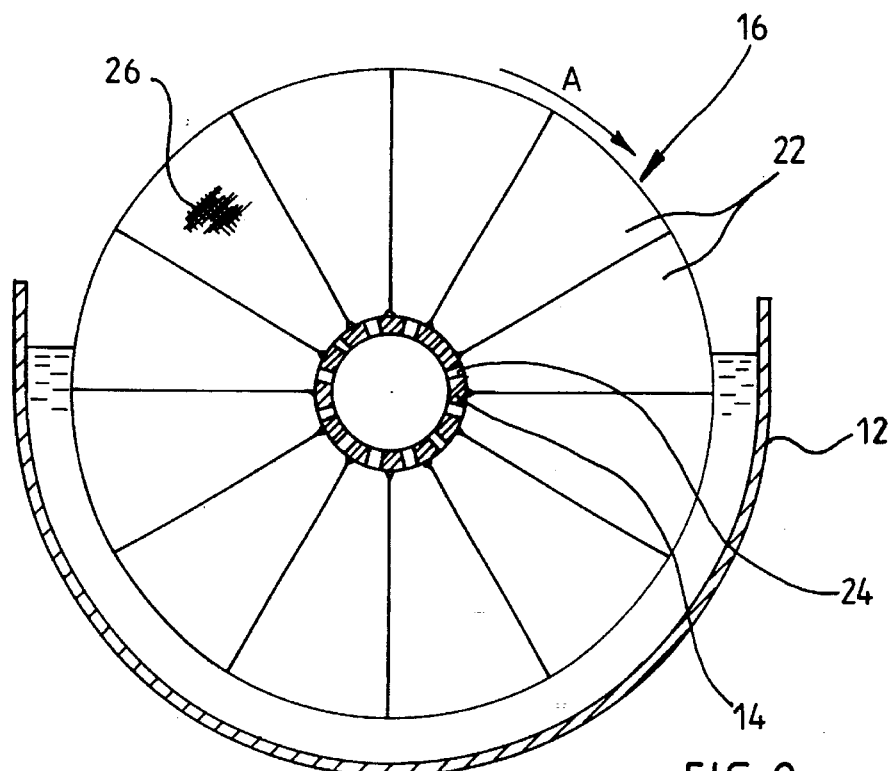
FIG. 2 schematically illustrates a disc of the disc filter.

According to FIGS. 1 and 2 a disc filter 10 comprises a vat 12 having a shaft 14 mounted with bearings at the ends thereof. Said shaft 14 is provided with a number of filter discs 16. Means 18 are arranged between the discs 16 for removing the filtered cake from the apparatus. At least one end of the shaft 14 is provided with means 20 for removing the filtrate from the inside of the shaft 14. Discs 16 comprise sectors 22, the interior of which is connected to the interior of the shaft 14 by means of flow opening 24, through which the filtrate flows from the sector 22 to the inside of the shaft 14. The sector 22 is covered by a wire cloth 26 or like.

FIG. 3 schematically illustrates a sector 22 of the disc filter in accordance with a preferred embodiment of the present invention and FIGS. 4 and 5 especially illustrate the supporting structure thereof. The outer end O (higher in the drawing) of the sector 22 is substantially parallel to the rim of the disc and it also substantially joins the rim of the disc. It is, of course, possible that in some cases the outer end O may not be curved but also, for example due to manufacturing reasons, straight. The inner end I (at the bottom in the drawing) of the sector is usually straight, but it may also be curved. Further, the direction of the perpendicular drawn to the inner end I may, if desired, deviate from the direction of the center line of the sector. The inner end I of each sector 22 is provided with a flow channel (not shown), by means of which the hollow interior of the sector is connected to the filtrate discharge channels (not shown) arranged into connection with the shaft of the filter. A preferred embodiment of the sector 22 comprises, according to FIGS. 4 and 5, two opposed perforated plate elements 30 and 32 attached, for example, by welding to each other, and a filter member 34 (shown only in FIG. 4), preferably a plastic sleeve or metal wire, is stretched over the surface of the plate. The perforated plate elements 30 and 32 are waved according to the drawings so that there is a relatively long portion 38 parallel to the surface of the sector between two adjacent recesses 36. The recesses of the opposed perforated plate elements 30 and 32 are arranged in this embodiment to alternate so that a recess 36 of the first plate 30 is supported by a part 38 of the plate 32. This results in a good supporting surface to the wire with as little need as possible to bend the perforated plate. By attaching the perforated plate elements 30 and 32 to each other of the bottom of the recesses 36 a sturdy box structure is obtained, which effectively resists both axially directed forces tending to bend the sector in a radial plane and axially directed forces tending to bend the sector in a plane tangential o the rim. At least 70of the surface of each perforated plate element 30, 32 must form the surface part 38 parallel to the wire, in other words the wire 34 is supported of at least 70% of the surface area thereof. At least the part 38 of the surface of each perforated plate element parallel to said wire must be perforated, but preferably the plate elements 30 and 32 are perforated throughout their entire area. FIGS. 4 and 5 also illustrate, how the dimension of the sector parallel to the shaft of the filter increases when moving from the outer rim inwards (sections A—A and B—B in FIG. 3). By this arrangement it is possible to increase the cross-sectional flow area to correspond to the increasing amount of the filtrate to be moved.

FIG. 6 illustrates a second embodiment of a sector of the disc filter in accordance with the present invention, in which the recesses 36' of the perforated plates 30' and 32' are arranged to face each other and the plates 30' and 32' are thus attached to each other of the bottom of the opposed recesses 36'.

It is a characterizing feature of all shown embodiments that the recesses of each sector are radial as shown in FIG. 3. The recesses may, however, be, for example, parallel in each sector, if the manufacturing technique or the operation of the sector such requires.

As becomes apparent from the above description, a filter sector in accordance with the present invention is very simple to manufacture. It results, however, in a structure that at least corresponds in strength to the prior art sectors. It must be noted that the present invention is illustrated above with references to two exemplary embodiments. Said examples are given only to exemplify, not to restrict the invention, but the inventive concept may be applied to many other structures. Thus the present invention is defined merely by the accompanying patent claims.

I claim:

1. A disc filter sector comprising:

a filter member; and a supporting structure for said filter member;

said supporting structure comprising two opposed perforated plate elements each consisting of a plurality of substantially flat supporting portions substantially parallel to said filter member and engaging said filter member, and a plurality of recess portions spaced from each other by said supporting portions and not engaging said filter member, recess portions of each of said opposed plate elements engaging a portion of the other of said opposed plate elements.

2. A disc filter sector as recited in claim 1 wherein each of said plate elements has a surface area, and wherein at least 70% of the surface area of each of said plate elements comprises said substantially flat supporting portions.

3. A disc filter sector as recited in claim 2 wherein recess portions of each of said opposed plate elements engages and is attached to recess portions of the other of said opposed plate elements.

4. A disc filter sector as recited in claim 2 wherein recess portions of each of said opposed plate elements engages and is attached to supporting portions of the other of said opposed plate elements.

5. A disc filter sector as recited in claim 3 wherein portions of said opposed plate elements are attached to each other by welding.

6. A disc filter sector as recited in claim 4 wherein portions of said opposed plate elements are attached to each other by welding.

7. A disc filter sector as recited in claim 1 wherein said recess portions extend in a substantially radial direction.

8. A disc filter sector as recited in claim 1 wherein said sector includes an outer end and an inner end, said sector having a greater width at said outer end than at said inner end.

9. A disc filter sector as recited in claim 1 wherein recess portions of each of said opposed plate elements engages and is attached to recess portions of the other of said opposed plate elements.

10. A disc filter sector as recited in claim 1 wherein recess portions of each of said opposed plate elements engages and is attached to supporting portions of the other of said opposed plate elements.

11. A disc filter sector as recited in claim 9 wherein portions of said opposed plate elements are attached to each other by welding.

12. A disc filter sector as recited in claim 10 wherein portions of said opposed plate elements are attached to each other by welding.

13. A disc filter sector as recited in claim 9 wherein said recess portions extend in a substantially radial direction.

14. A disc filter sector as recited in claim 10 wherein said recess portions extend in a substantially radial direction.

15. A disc filter sector as recited in claim 1 wherein each of said opposed plate elements have side edges with inwardly bent portions which engage inwardly bent portions of the other of said opposed plate elements; and wherein engaging portions of said opposed plate elements are attached to each other by welding.

16. A disc filter sector as recited in claim 1 including an inner end and an outer end; and in combination with a plurality of other disc filter sectors so as to form a disc filter connected at said inner ends of said sectors to a perforated shaft, liquid flowing through said filter members flowing between said opposed plate elements into said perforated shaft.

17. A disc filter sector as recited in claim 1 wherein said plate elements have an outer rim; and wherein engaging portions of said opposed plate elements comprise means for effectively resisting both axially directed forces tending to bend said sector in a plane tangential to said rim, and in a radial plane.

18. A disc filter sector as recited in claim 9 wherein said plate elements have an outer rim; and wherein attached engaging portions of said opposed plate elements comprise means for effectively resisting both axially directed forces tending to bend said sector in a plane tangential to said rim, and in a radial plane.

19. A disc filter sector as recited in claim 10 wherein said plate elements have an outer rim; and wherein attached engaging portions of said opposed plate elements comprise means for effectively resisting both axially directed forces tending to bend said sector in a plane tangential to said rim, and in a radial plane.

20. A disc filter sector comprising:

a filter member; and a supporting structure for said filter member; said supporting structure comprising two opposed perforated plates each comprising a plurality of substantially flat supporting portions engaging and supporting said filter member, and a plurality of recess portions spaced from each other by said supporting portions and not engaging said filter member, said recess portions of each of said opposed plates engaging and attached to said substantially flat supporting portions of the other of said plates.

21. A disc filter sector comprising:

a filter member; and a supporting structure for said filter member;

said supporting structure comprising two opposed perforated plate elements each consisting of a plurality of supporting portions engaging said filter member, and a plurality of recess portions spaced from each other by said supporting portions and not engaging said filter member, recess portions of each of said opposed plate elements engaging a portion of the other of said opposed plate elements; and wherein each of said plate elements has a surface area, and wherein at least 70% of the surface area of each of said plate elements comprises said supporting portions.

* * * * *